United States Patent [19]

Stacey et al.

[11] 3,870,762

[45] Mar. 11, 1975

[54] DEHYDROCHLORINATION PROCESS

[75] Inventors: Martyn Hugh Stacey; Terrence Donald Tribbeck, both of Runcorn, England

[73] Assignee: Imperial Chemical Industries Limited, London, England

[22] Filed: Nov. 16, 1972

[21] Appl. No.: 307,209

[30] Foreign Application Priority Data

Dec. 2, 1971 Great Britain .......................... 56007

[52] U.S. Cl. ............................................. 260/654 D
[51] Int. Cl. ............................................. C07c 21/08
[58] Field of Search ................................. 260/654 D

[56] References Cited
UNITED STATES PATENTS 2,803,678  8/1952  Conrad .......................... 260/654 D

FOREIGN PATENTS OR APPLICATIONS 206,575  2/1968  U.S.S.R. .......................... 260/654 D

Primary Examiner—Delbert E. Gantz
Assistant Examiner—Joseph A. Boska
Attorney, Agent, or Firm—Cushman, Darby & Cushman

[57] ABSTRACT 1,1,2-trichloroethane is dehydrochlorinated in the presence of a chloride or fluoride of potassium, rubidium or caesium in the vapour phase and at a temperature in the range from 125°C to 275°C to give a product containing a high proportion of vinylidene chloride.

7 Claims, No Drawings

DEHYDROCHLORINATION PROCESS

This invention relates to a process for the manufacture of vinylidene chloride.

1,1,2-trichloroethane can be dehydrochlorinated by heating said trichloroethane in the vapour phase at elevated temperatures in the range 425°C to 500°C to give a mixture of 1,1-dichloroethylene (vinylidene chloride) and 1,2-dichloroethylene (cis and trans isomers) together with hydrogen chloride. Such a process has an advantage over a liquid phase process which utilises aqueous dehydrochlorinating basic compounds such as milk-of-lime since in the latter process chlorine is lost from the organic starting materials as metal chloride. In contradistinction in the vapour phase process by-product hydrogen chloride itself is available for various uses.

However, up to the present time no matter what means have been empolyed for carrying out the vapour phase process the latter process has the overwhelming disadvantage that the desirable 1,1-dichloroethylene has been found in the mixed dichloroethylene product in the proportion of not greater than (and usually much less than) 50 percent by weight of the total dichloroethylenes formed. The 1,2-dichloroethylene components of the mixed product are not of great commercial significane. Thus the selectivity of the vapour phase process to give vinylidene chloride has been decidedly low and while there is every incentive to increase the selectivity this has been marked up to the present time with a singular lack of success.

It is an object of the present invention to provide a process for the vapour phase dehydrochlorination of 1,1,2-trichloroethane which gives improved proportions of vinylidene chloride in the product.

According to the present invention therefore we provide a process for the manufacture of vinylidene chloride which comprises treating 1,1,2-trichloroethane in the vapour phase in the presence of a catalytic metal halide which comprises at least one halide of potassium or caesium or rubidium.

In the present process a single halide or mixture of halides of one of the said metals may be employed but halides of two or more of said metals may be employed if desired. Also, compounds of said metals which form a halide under the reaction conditions, for example a carbonate or a hydroxide, may be employed if desired. The preferred halide is a chloride. We also prefer to use those catalytic materials containing a caesium halide; caesium chloride is especially suitable.

It is preferred to employ reaction temperatures not exceeding 350°C although higher temperatures may be used if desired. More preferably the temperature is below 300°C. A reaction temperature of at least 100°C is desirable, as the speed of reaction is usually inconveniently slow below this temperature. The most suitable temperature are within the range 125°C to 275°C, for example, temperatures in the range 150°C to 275°C.

The 1,1,2-trichloroethane used as feedstock for our process may be used alone or may be associated with other chlorinated hydrocarbons, but outstandingly good results are obtained when 1,1,2-trichloroethane is the sole organic reactant fed. The feedstock may, if desired, be diluted with inert diluent gas or vapour.

The said metallic halides may be carried on a support or may be unsupported. The supports may be inert in the dehydrochlorination reaction or they may themselves have some small catalytic activity. Examples of the latter type of support include silica and alumina although silica is preferred.

A wide range of proportions by weight of said metallic halides with reference to support plus halide may be used. For example good results can be obtained when using 2.5 parts to 12.5 parts by weight of the metal halide per 100 parts of the combined weight of support and halide.

Fixed or fluidised beds of the catalytic materials can be employed.

It is a surprising feature of the present process that by using said metallic halides and particularly when using them in conjunction with the low reaction temperatures referred to hereinbefore that high selectivities to vinylidene chloride in the chlorinated organic product, usually considerably greater than 75 percent by weight, are obtained.

The following Examples illustrate but do not limit the invention. Where percentages are mentioned they are by weight.

EXAMPLE 1

A catalyst was prepared by impregnating a silica support known as "Porasil" (Registered Trade Mark) with an aqueous solution of potassium chloride, followed by drying of the supported catalyst at 120°C. The dried catalyst contained 10 percent KCl and the surface area of the supported catalyst was 55 m²/g.

A horizontal silica tube containing a sample of the catalyst was placed in a block furnace, the temperature being controllable in the range 150°C to 350°C. A stream of helium gas (flow rate 30 ml/min) into which were injected small quantities of vaporised 1,1,2-trichloroethane was passed through the catalyst zone. The gaseous effluent from the fixed catalyst bed was passed directly into an analytical chromatograph. At the reaction temperatures shown the organic reaction product was found to contain:

|  | 150°C | 250°C |
|---|---|---|
| Vinylidene chloride | 77% | 84% |
| 1,2-dichloroethylene (trans) | 12% | 10% |
| 1,2-dichloroethylene (cis) | 10% | 5% |
| Vinyl chloride | 1% | 1% |

Over the temperature range 200°C to 300°C vinylidene chloride amounted to more than 80 percent of the product. At 350°C there was obtained 100 percent conversion of the trichloroethane to a product similar to that obtained at 150°C.

EXAMPLE 2

A supported catalyst containing 10 percent potassium fluoride was prepared by the procedure of Example 1. Runs were carried out in a similar manner to that of Example 1. At reaction temperatures of 100°C and 150°C the organic product was found to contain:

| Vinylidene chloride | 85% |
|---|---|
| 1,2-dichloroethylene (trans) | 11% |
| 1,2-dichloroethylene (cis) | 3% |
| Monochloroacetylene | 1% |

EXAMPLE 3

A supported catalyst containing 10 percent caesium fluoride was prepared by the procedure described in Example 1. Runs were carried out as in Example 1. At reaction temperatures of 150°C and 200°C the organic product was found to contain:

| | |
|---|---|
| Vinylidene chloride | 90% |
| 1,2-dichloroethylene (trans) | 7% |
| 1,2-dichloroethylene (cis) | 3% |

EXAMPLE 4

A supported catalyst containing 10 percent caesium chloride was prepared by the procedure described in Example 1. Runs were carried out as in Example 1. At reaction temperatures of 150°C and 250°C the organic product was found to contain:

| | 150°C | 250°C |
|---|---|---|
| Vinylidene chloride | 89% | 85% |
| 1,2-dichloroethylene (trans) | 8% | 7% |
| 1,2-dichloroethylene (cis) | 3% | 6% |
| Vinyl chloride | — | 1% |

At 250°C the conversion of 1,1,2-trichloroethane was 99 percent.

EXAMPLE 5

A supported catalyst containing containing 10% caesium chloride was prepared by the procedure described in Example 1.

A vertical silica tube containing a sample of the catalyst was placed in a block furnace, the temperature being controlled at approximately 250°C. 30 ml/min of nitrogen containing 1,1,2-trichloroethane vapour were passed upwardly through the tube.

The organic reaction product was analysed as in Example 1 and was found to contain 86.5 percent vinylidene chloride, 1,2-dichloroethylene (trans) 8 percent, 1,2-dichloroethylene (cis) 5.5 percent. The run was continued for a period of 100 hours. Analysis showed that the composition of the product was substantially the same throughout the Run. After said period the activity of the catalyst was still constant and the Run was terminated.

EXAMPLE 6

A supported catalyst containing 10% rubidium chloride was prepared by a procedure as described in Example 1. The surface area of the supported catalyst was 300 m²/g. Runs were carried out as in Example 1. At reaction temperatures of 150°C and 250°C the organic product was found to contain:

| | 150°C | 250°C |
|---|---|---|
| Vinylidene chloride | 86% | 85% |
| 1,2-dichloroethylene (trans) | 9% | 7% |
| 1,2-dichloroethylene (cis) 5% | 6% | |
| Vinyl chloride | — | 1% |

EXAMPLE 7

The catalyst used in this run consisted of unsupported caesium chloride. A Run was carried out as in Example 1. At the reaction temperature of 250°C the organic product was found to contain:

| | |
|---|---|
| Vinylidene chloride | 90% |
| 1,2-dichloroethylene (trans) | 6% |
| 1,2-dichloroethylene (cis) | 4% |

EXAMPLE 8

A supported catalyst containing a total of 10 percent of a mixture of caesium and potassium chlorides (60 mole percent CsCl ; 40 mole percent KCl) was prepared by the procedure described in Example 1. A Run was carried out as in Example 1. At 200°C the organic product was found to contain:

| | |
|---|---|
| Vinylidene chloride | 92% |
| 1,2-dichloroethylene (trans) | 6% |
| 1,2-dichloroethylene (cis) | 2% |

EXAMPLE 9

A catalyst was prepared by impregnating an alumina support (manufactured by Pechiney Produit Chimiques-St-Gobain, France, and having the code No. SCS 130) with an aqueous solution of caesium chloride, followed by drying of the supported catalyst at 120°C. The dried catalyst contained 10 percent caesium chloride. A Run was carried out as in Example 1 but at 200°C. The organic product had the following approximate composition:

| | |
|---|---|
| Vinylidene chloride | 85% |
| 1,2-dichloroethylene (trans) | 11% |
| 1,2-dichloroethylene (cis) | 4% |

EXAMPLE 10

A supported catalyst containing 5 percent caesium chloride was prepared by a procedure similar to that described in Example 1. Runs were carried out in the manner described in Example 5. At reaction temperatures of 250°C and 300°C the organic product was found to contain:

| | 250°C | 300°C |
|---|---|---|
| Vinylidene chloride | 89% | 86% |
| 1,2-dichloroethylene (trans) | 6% | 8% |
| 1,2-dichloroethylene (cis) | 5% | 6% |

What we claim is:

1. In a process for the manufacture of vinylidene chloride from 1,1,2-trichloroethane by catalytic dehydrochlorination, the improvement which comprises dehydrochlorinating in the vapour phase in the presence of a catalyst which comprises member of the group consisting of the chlorides and fluorides of potassium, caesium, rubidium and mixtures thereof at a temperature in the range from 125°C to 275°C.

2. A process as claimed in claim 1 in which the catalyst is a caesium chloride or fluoride.

3. A process as claimed in claim 2 in which the catalyst is caesium chloride.

4. A process as claimed in claim 1 carried out at a temperature in the range 150° to 275°C.

5. A process as claimed in claim 1 in which the catalyst is carried on a support.

6. A process as claimed in claim 5 in which the catalyst is carried on silica.

7. A process as claimed in claim 5 in which the proportion by weight of catalyst is in the range 2.5 to 12.5 parts by weight per 100 parts of the combined weight of support and catalyst.

* * * * *

UNITED STATES PATENT OFFICE
CERTIFICATE OF CORRECTION

Patent No. 3,870,762      Dated March 11, 1975

Inventor(s) Martyn Hugh Stacey; Terence Donald Tribbeck

It is certified that error appears in the above-identified patent and that said Letters Patent are hereby corrected as shown below:

IN THE HEADING:

At paragraph [75] Inventors, change "Terrence" to read --Terence--.

Signed and Sealed this twenty-third Day of September 1975

[SEAL]

Attest:

RUTH C. MASON
Attesting Officer

C. MARSHALL DANN
Commissioner of Patents and Trademarks